United States Patent
Olin et al.

(10) Patent No.: US 6,917,140 B2
(45) Date of Patent: Jul. 12, 2005

(54) MICROPOSITIONING DEVICE

(75) Inventors: Håkan Olin, Göteborg (SE); Fredik Althoff, Mölnlycke (SE); Krister Svensson, Surte (SE)

(73) Assignee: Nanofactory Instruments AB, Gothenburg (SE)

( * ) Notice: Subject to any disclaimer, the term of this patent is extended or adjusted under 35 U.S.C. 154(b) by 41 days.

(21) Appl. No.: 10/433,575

(22) PCT Filed: Dec. 3, 2001

(86) PCT No.: PCT/SE01/02642

§ 371 (c)(1),
(2), (4) Date: Aug. 28, 2003

(87) PCT Pub. No.: WO02/46821

PCT Pub. Date: Jun. 13, 2002

(65) Prior Publication Data

US 2004/0051424 A1 Mar. 18, 2004

(30) Foreign Application Priority Data

Dec. 5, 2000 (SE) .............................. 0004471

(51) Int. Cl.⁷ .............................................. H01L 41/08
(52) U.S. Cl. ................................. 310/323.02; 310/328
(58) Field of Search ............................. 310/323.02, 328

(56) References Cited

U.S. PATENT DOCUMENTS 4,195,243 A * 3/1980 Thaxter ...................... 310/317
4,219,755 A * 8/1980 O'Neill et al. .............. 310/348
5,229,679 A   7/1993 Higuchi et al.
5,325,010 A * 6/1994 Besocke et al. ............ 310/317
5,332,942 A * 7/1994 Rennex ...................... 310/328
5,568,004 A * 10/1996 Kleindiek ................... 310/328

FOREIGN PATENT DOCUMENTS

EP     0292989    11/1988
EP     0599582    6/1994

* cited by examiner

*Primary Examiner*—Mark Budd
(74) *Attorney, Agent, or Firm*—Harness, Dickey & Pierce, P.L.C.

(57) ABSTRACT

This invention relates to a device for micropositioning of an object (4), e.g. for use in a microscope. The device comprises an acceleration unit (1) and an intermediate part (3), connecting said acceleration unit (1) with said object (4). The position of the object relative to the acceleration unit (1) is variable at high acceleration or retardation of said acceleration unit (1), owing to mechanical inertia of the object (4). Further, the intermediate part (3) has a first end (3'), being attached to said acceleration unit (1), and a second end (3"), being provided with an essentially circumferential contact surface (3a), and the object (4) is provided with clamping elements (4'). These clamping elements (4') are adapted to clamp around said contact surface (3a) of said intermediate part (3) in order to hold the object (4) in relation to the intermediate part (3) merely by the clamping force and the frictional force exerted by said clamping elements (4') upon said contact surface (3a).

20 Claims, 1 Drawing Sheet

MICROPOSITIONING DEVICE

TECHNICAL FIELD OF THE INVENTION

This invention relates to an improved device for micropositioning of an object, especially for use in a microscope, such as a TEM (transmission electron microscope), an SPM (scanning probe microscope) or the like.

BACKGROUND ART

In many fields there is a need for positioning of objects with great accuracy. This is most important, for example in a scanning probe microscope, SPM, in which a sample and a probe must be moved towards each other before starting a scanning. A technique of carrying out such moving involves an inertia-type motor, according to the above description, in which excitation of a piezoelectric tube causes an extension of the same and a corresponding movement of an object connected therewith, whereupon the piezoelectric tube is very rapidly retracted as the excitation ceases, and owing to moment of inertia in the system, the object that is to be moved then stays in the position where it was located when the piezoelectric tube was in its excited position. A device of the above type is described in, for example, K. Svensson, F. Althoff and H. Olin, "A compact inertial slider STM", Meas. Sci. Techn., 8, 1360–1362 (1997). This publication describes a device for micropositioning in a scanning tunnel microscope, comprising both a sample and a sharp scanning tip. The position of the sharp scanning tip relative to the sample is controlled by means of two concentric piezoelectric tubes, the inner tube being used for scanning of the sharp scanning tip and the outer tube being used for inertia movement of the sample. The construction also comprises a positioning unit including two parts, a first part, which is fixedly connected to the outer tube, and a second part, which holds the sample. The second part is slidingly arranged on the first part, the sliding surface being located in a plane which is not perpendicular to the sharp scanning tip. When applying, for example, a serrated waveshape to the piezoelectric element, displacements between these two parts occur as the acceleration exceeds the limit of the static friction between the parts. The two parts are arranged in such manner that, when sliding towards each other in said sliding surface, the sample arranged on the second part is moved so as to be closer or further away from the prod while at the same time the actual sample surface is continuously held perpendicular to the sharp scanning tip. This construction is very compact and has a number of desirable properties, such as a low noise level. However the construction is complicated and comprises two piezoelectric elements. A micropositioning device of a simpler design is therefore desirable, which has a short mechanical loop, to reduce the mechanical noise in the form of vibrations in the system. A simpler design of the system further contributes to reducing the risk that dirt and other external interference reduces or fully eliminates the function of the inertia-type motor. Furthermore the above prior-art construction is particularly adapted to scanning tunnel microscopy (STM), and a more general device for use in connection with e.g. scanning probe microscopy (SPM) and other applications is desirable.

OBJECT OF THE INVENTION

Consequently, an object of the present invention is to accomplish a micropositioning device, having a simple design as well as a general, compact and stable construction.

SUMMARY OF THE INVENTION

According to the invention, these and other objects are achieved by a micropositioning device of the type described above, wherein said intermediate part has a first end, being attached to said acceleration unit, and a second end, being provided with an essentially circumferential contact surface, and in that said object is provided with clamping elements, whereby said clamping elements are adapted to clamp around said contact surface of said intermediate part in order to hold the object in relation to the intermediate part merely by the clamping force and the frictional force exerted by said clamping elements upon said contact surface. This construction enables a stable and compact micropositioning device with a simple design, which is easy to manufacture.

Preferably, said attachment between the acceleration unit and the intermediate part is releasable. This enables a simple exchange of the intermediate part, if a differently shaped intermediate part is in an application, or if the intermediate part is damaged or worn out. Further, according to a preferred embodiment, the clamping elements of the object are removably clamped around said contact surface of the intermediate part. This enables an easy exchange of the object, as well as, or instead of the intermediate part.

Preferably, said acceleration unit comprises a tube, or the like, formed of a piezoelectric material, which provides a simple and well-tested mechanism for obtaining rapid acceleration and retardation movements.

Suitably, the intermediate part is electrically isolated from the piezoelectric tube by means of an isolating attachment part. In this way, the high voltage needed to operate the piezoelectric tube is effectively isolated from the other parts of the construction, avoiding unwanted charging of the object or other parts of the device.

Preferably, the object, its contact elements and the intermediate part constitute an uninterrupted electric conductive path. This construction enables an effective discharge of the object, for example by connecting the conductive path to a ground line.

According to a preferred embodiment the contact surface of the intermediate part is an at least partially spherical surface. Consequently, the object is freely movable under the action of forces, and is rotatable relative to the intermediate part in all directions. Conveniently, the contact elements of the object consist of several sliding rods protruding from the object body and preferably, said sliding rods are essentially parallel and arranged along the circumference of the object body. This embodiment further enables the object to be freely displaceable towards and away from the piezoelectric tube 1 as well as being rotatable in all directions. Preferably, at least one of said sliding rods is provided with a stopper. This presents the object from being displaced too far in the z-direction and consequently loose its contact with the intermediate part and fall off.

Finally, the object is preferably formed as a holder for a measurement sample or the like. The fact that the object is a sample holder and not the sample itself enables the object to be formed for ultimate contact with the intermediate object and, at the same time, to constitute an expedient holder for a sample or a probe.

BRIEF DESCRIPTION OF THE DRAWING

The invention will now be described in more detail with reference to a preferred embodiment, which is illustrated in the accompanying drawing.

DESCRIPTION OF PREFERRED EMBODIMENTS

Figure 1:
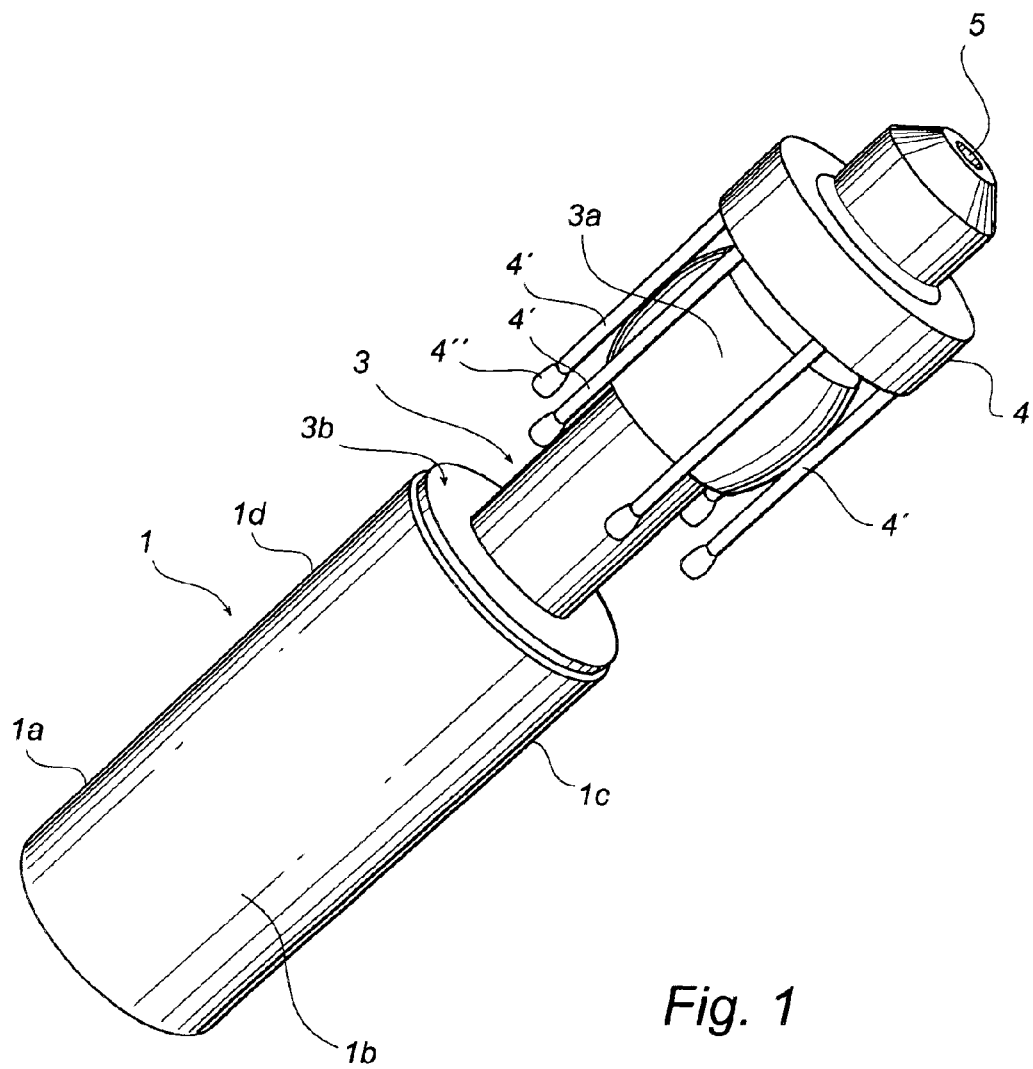
FIG. 1 is a schematic perspective view of an embodiment of the invention.

One embodiment of a micropositioning device in accordance with the invention is shown in FIG. 1. This embodiment comprises a tube 1 of a piezoelectric material, which constitutes an acceleration unit. The outer circumferential surface of the tube 1 is divided into four electrically separated segments 1a–1d (1d not shown), which extend in the longitudinal direction of the tube 1 and each hold an angle segment of the circumferential surface of the tube 1 corresponding to about 25% of the total extent. Each segment is, with the aid of electric connecting means (not shown), connected with a wave generator, and the segments 1a, 1b, 1c and 1d can be controlled independently of each other.

In one end of the piezoelectric tube 1, an attachment part 3b of an electrically isolating material is arranged, said attachment part 3b being provided with an opening 3b'. When said attachment part 3b is placed in the end of the piezoelectric tube 1, said opening is essentially centered with the longitudinal axis or the piezoelectric tube 1. Further, a connection part of an electrically conductive material is provided. A first end of said connection part is adapted to be fixedly connected with said attachment part 3b, in this case entered into the opening 3b' of the attachment part 3b, and a second end is provided with an essentially circumferential contact surface 3a, in this case an essentially spherical surface (see FIG. 1), similar to a ball joint. When in its mounted position, the connection part projects from the piezoelectric tube 1 in the longitudinal direction of the piezoelectric tube 1. Further, the distal end of the spherical contact surface 3a is cut of, in order to form an essentially plane surface enabling a compact micropositioning device, as described hereinafter. Together, said connection part and said attachment part 3b forms an intermediate part 3.

Further, the micropositioning device comprises an object 4, being formed as a sample holder, having an efficient sample holder device 5, that is suitably adapted to hold a measurement sample. The sample holder device 5 can be of different designs and is not crucial to the invention and will therefore not be described in more detail. The object is further provided with a plurality of clamping elements 4', having a rod-like shape and extending in parallel from an essentially plane surface of said object 4, said clamping elements 4' being mounted in a circle to trace an essentially cylindrical surface. Said clamping elements are made of a resilient material and are adapted to be clamped around said contact surface 3a of the intermediate part 3, thereby holding the object 4 relative to the intermediate part 3 merely by clamping action and friction. Consequently, the object is freely movable under the action of forces, i.e. it is displaceable towards and away from the piezoelectric tube 1 and rotatable in all directions. Said clamping elements 4' are further provided with stopper means 4", which prevents the object 4 from performing too large movements in the z-direction, which would result in the clamping elements 4' of the object 4 loosing their contact with the contact surface 3a of the intermediate part 3.

In operation, segments 1a–1d of the piezoelectric tube 1 are supplied with an electric wave, suitably a cycloid-like electric wave since this merely produces high acceleration in one direction, but also serrated waves and other types of electric waves are usable. The waveform of the operating voltage, which excites the piezoelectric tube 1, is modulatable to provide the desired movement of the object 4. Other suitable modulating parameters are amplitude and frequency. According to the desired motion of the piezoelectric tube 1, all segments 1a–1d can be supplied with identical waves for providing a uniform extension of the piezoelectric tube 1, or be supplied with different waves for providing a bending motion of the piezoelectric tube 1, or more concrete an extension of one side of the tube while the length of the other side of the tube is unchanged. When moving the sample in the z direction, from the piezoelectric tube 1, first an extension of the tube occurs, followed by a return to the initial length. By making this change in such manner that the piezoelectric tube 1 rapidly changes from a relatively high extension speed to a relatively high return speed, i.e. making the change from extension to return so rapid that the accelerating force temporarily exceeds the combined frictional force and resilience between the clamping elements of the object 4 and the intermediate part, a movement of the object 4 relative to the intermediate part occurs owing to a mechanical moment of inertia of the object. By using a cycloidal pulse an opposite motion of the object is besides prevented in the change between return and extension of the piezoelectric tube since the total acceleration is then much lower. By supplying the piezoelectric tube 1 with an inverted cycloidal wave, an opposite motion is achieved, i.e. a motion of the object towards the piezoelectric tube 1. To provide a turning of the object 4 relative to the intermediate part 3, an appropriate segment 1a, or pair of segments of the piezoelectric tube, is supplied with a corresponding cycloidal wave whereas the remaining segments 1b, 1c, 1d are left unexcited. Thus, an extension of one side of the piezoelectric tube relative to the other side occurs, which results in said bending of the piezoelectric tube. When returning to the unexcited position, the accelerating force will exceed the frictional force and the clamping force merely for a subset of the clamping elements 4', i.e. those clamping elements that are arranged on the same side of the micropositioning device as said exited segments, which results in turning of the object 4 relative to the intermediate part 3 in the return motion. By combining different segments, the object in this embodiment is movable and controllable in three dimensions.

As described above, the distal end of the spherical contact surface 3a is cut off, in order to form an essentially plane surface, facing the object (see FIG. 1). Further the object 5 is provided with a plane surface on which said protruding clamping elements 4' are arranged, said surface facing the corresponding plane surface of the intermediate part 3. This construction results in a compact construction in the z-direction, without deteriorating the manoeuvrability of the construction.

This embodiment has major advantages regarding applicability, due to the fact that the connections between the intermediate part 3 and the piezoelectric tube 1 as well as between the intermediate part 3 and the clamping elements 4' are releasable. This allows for easy replacement of all parts included in the micropositioning device. For example, the object 4 (The sample holder) may be replaced for an object with a different sample holder device 5, in order to adjust the device for a new experiment. Further, the intermediate part may be replaced for a new one, if scratches or the like appear on the contact surface, deteriorating and disturbing the free movement of the clamping elements 4' on said contact surface 3a. Another possibility is to replace the intermediate part 3 and/or the object 4, in order to adjust the clamping force and friction between these parts in the micropositioning device, for example by using an intermediate part with a spherical contact surface 3a with slightly larger radius than before. In this way the ease of movement between the intermediate part 3 and the object 4 may be set for a specific application.

The above embodiments are only stated for exemplification and are not intended to limit the scope of the invention. A number of modifications and constructional changes, which are obvious to those skilled in the art, can, of course, be made without departing from the basic inventive idea as defined in claim 1. For instance, it can be mentioned that the clamping elements 4' may have different shapes, and not necessarily have to be straight rods, as in the above embodiment. For example, bent rods that more or less encompass the contact surface 3a, providing a ball joint like connection are possible. Such a construction does not however have a natural movability in the z-direction, but this may be arranged by means of a motor or a sliding engagement between for example the connection part and the attachment part 3b of the intermediate part.

Moreover, the piezoelectric tube, which is used in the embodiment described above, can be replaced by, for example, a stepping motor, which can cause sufficiently high acceleration of the positioning unit. Further, the piezoelectric element may have other shapes than the tube shape described herein, and may for example have a rectangular shape. However, in that case two or more connected piezoelectric elements may be needed in order to provide maneuverability in three dimensions.

Further, the attachment part 3b or the intermediate part 3 may be attached to the inside or the outside of the piezoelectric tube 3, like in FIG. 1, but can also be slidingly arranged in or on the outer surface of the piezoelectric tube 3, in order to facilitate an additional movement possibility in the z-direction. The number of clamping elements is variable, and the shape of these clamping elements is not limited to the rod shape shown in FIG. 1. The clamping elements may for example be made of strips of sheet metal, arched elements or the like. Nor is the shape of the object essential for the invention and the object may therefor more or less be freely adapted to a desired application. Finally, although all clamping elements described above are of a resilient type, it is possible to use a number of spaced-apart non-resilient elements.

What is claimed is:

1. A device for micropositioning of an object, said device comprising:
   an acceleration unit; and
   an intermediate part, connecting said acceleration unit with said object, the position of the intermediate part relative to the acceleration unit being variable at at least one of high acceleration and retardation of said acceleration unit, owing to mechanical inertia of the object, wherein said intermediate part includes,
   a first end, attached to said acceleration unit, and
   a second end, provided with an essentially circumferential contact surface, wherein said object is provided with clamping elements, said clamping elements being adapted to clamp around said contact surface of said intermediate part to hold the object in relation to the intermediate part merely by a clamping force and a frictional force exerted by said clamping elements upon said contact surface.

2. A device as claimed in claim 1, wherein said attachment between the acceleration unit and the intermediate part is releasable.

3. A device as claimed in claim 1, wherein said clamping elements of the object are removably clamped around said contact surface of the intermediate part.

4. A device as claimed in claim 1, wherein said acceleration unit includes a tube, formed of a piezoelectric material.

5. A device as claimed in claim 4, wherein the intermediate part is electrically isolated from the piezoelectric tube by an isolating attachment part.

6. A device as claimed in claim 1, wherein the object, its contact elements and the intermediate part constitute an uninterrupted electric conductive path.

7. A device as claimed in claim 1, wherein the contact surface of the intermediate part is an at least partially spherical surface.

8. A device as claimed in claim 1, wherein the contact elements of the object include several sliding rods protruding from the object body.

9. A device as claimed in claim 8, wherein said sliding rods are essentially parallel and arranged along the circumference of the object body.

10. A device as claimed in claim 9, wherein at least one of said sliding rods is provided with a stopper.

11. A device as claimed in claim 1, wherein the object is formed as a holder for a measurement sample.

12. The device of claim 1, for use in a microscope.

13. A microscope, including the device of claim 1.

14. A device as claimed in claim 2, wherein said clamping elements of the object are removably clamped around said contact surface of the intermediate part.

15. A device as claimed in claim 2, wherein the object, its contact elements and the intermediate part constitute an uninterrupted electric conductive path.

16. A device as claimed in claim 2, wherein the contact surface of the intermediate part is an at least partially spherical surface.

17. A device as claimed in claim 2, wherein the contact elements of the object include several sliding rods protruding from the object body.

18. A device as claimed in claim 17, wherein said sliding rods are essentially parallel and arranged along the circumference of the object body.

19. A device as claimed in claim 18, wherein at least one of said sliding rods is provided with a stopper.

20. A device as claimed in claim 2, wherein the object is formed as a holder for a measurement sample.

* * * * *